United States Patent
Hess et al.

(10) Patent No.: US 10,970,878 B2
(45) Date of Patent: Apr. 6, 2021

(54) CAMERA CALIBRATION USING REFERENCE MAP

(71) Applicant: Lyft, Inc., San Francisco, CA (US)

(72) Inventors: Wolfgang Hess, Munich (DE); Holger Rapp, Munich (DE)

(73) Assignee: Lyft, Inc., San Francisco, CA (US)

(*) Notice: Subject to any disclaimer, the term of this patent is extended or adjusted under 35 U.S.C. 154(b) by 109 days.

(21) Appl. No.: 16/219,841

(22) Filed: Dec. 13, 2018

(65) Prior Publication Data

US 2020/0193643 A1 Jun. 18, 2020

(51) Int. Cl.
*G06K 9/00* (2006.01)
*G06T 7/80* (2017.01)
*G01S 5/02* (2010.01)

(52) U.S. Cl.
CPC .............. *G06T 7/85* (2017.01); *G01S 5/0284* (2013.01); *G06K 9/00744* (2013.01); *G06K 9/00798* (2013.01); *G06K 9/00818* (2013.01)

(58) Field of Classification Search
CPC ....... G06T 7/85; G06T 7/0004; G01S 5/0284; G06K 9/00798; G06K 9/00818
USPC ....... 382/100, 103, 104, 151, 162, 168, 172, 382/173, 181, 190, 199, 201, 203, 254, 382/285, 312, 154; 701/1, 10, 56, 33.1, 701/400, 408, 409
See application file for complete search history.

(56) References Cited

U.S. PATENT DOCUMENTS

| | | | | |
|---|---|---|---|---|
| 7,031,496 | B2* | 4/2006 | Shimano | G06K 9/6293 382/104 |
| 8,605,947 | B2* | 12/2013 | Zhang | G06K 9/00798 348/116 |
| 8,660,338 | B2* | 2/2014 | Ma | G06T 7/593 382/154 |
| 10,060,751 | B1* | 8/2018 | Chen | G06F 16/29 |
| 10,223,806 | B1* | 3/2019 | Luo | G06K 9/4604 |
| 10,223,807 | B1* | 3/2019 | Luo | G06T 7/579 |
| 10,565,457 | B2* | 2/2020 | Luo | G01S 17/86 |
| 2011/0109745 | A1* | 5/2011 | Nakatani | G01C 21/26 348/148 |
| 2014/0160289 | A1* | 6/2014 | Lee | G06K 9/00791 348/148 |
| 2020/0090322 | A1* | 3/2020 | Seo | G06K 9/6228 |
| 2020/0125845 | A1* | 4/2020 | Hess | G05D 1/0246 |

\* cited by examiner

*Primary Examiner* — Sheela C Chawan
(74) *Attorney, Agent, or Firm* — Baker Botts L.L.P.

(57) ABSTRACT

In one embodiment, a computing system accesses a number of features extracted from one or more first images. The extracted features are associated with at least one object captured in the first images. The first images are captured by a camera associated with a vehicle. The computing system identifies, in a reference map, reference features matching one or more of the features extracted from the first images. The reference features are associated with the at least one object captured in the first images. The computing system generates, for the camera, a calibration model by comparing the identified reference features in the reference map and the features that match the one or more reference features. The calibration model is used to calibrate second images captured by the camera associated with the vehicle.

19 Claims, 8 Drawing Sheets

CAMERA CALIBRATION USING REFERENCE MAP

BACKGROUND

A modern vehicle may include one or more vehicle cameras or sensors for monitoring the surrounding environment of the vehicle while the vehicle drives around. For example, the vehicle may use vehicle cameras to capture images or videos of the surrounding environment and may use a GPS to track the location of the vehicle. The cameras may capture a series of scenes of the surrounding environment at different locations. The vehicle may use one or more computing systems (e.g., an on-board computer) to collect data from the cameras and sensors. The collected data may be processed by the computing systems and may be uploaded to a cloud using a wireless connection.

However, the images or videos collected by typical vehicle cameras are unsuitable to be used in the aggregate, especially in applications that require high precision or accuracy. One reason for this is that the collected images or videos, or data extracted therefrom, are captured by a variety of different vehicle cameras, such as cameras of mobile phones, detachable dash cams, or integrated cameras of the vehicle, with different makes, models, software/hardware configurations, and even placements within the vehicle. As a result, the collected images or videos are generated by cameras with different lensing parameters (e.g., focal distance, field of view, distortions, etc.), image sensors, image processing algorithms (e.g., for white balancing, chromatic aberration, anti-aliasing, saturation adjustment, etc.), viewing angles, and any other optical, physical, or logical attributes of the cameras that affect the captured images. Due to, at least in part, the non-uniformity and relatively low quality of typical vehicle cameras, the collected images or videos, or data extracted therefrom, are unsuitable to be used in the aggregate for applications that require high accuracy and precision.

DESCRIPTION OF EXAMPLE EMBODIMENTS

Figure 1:
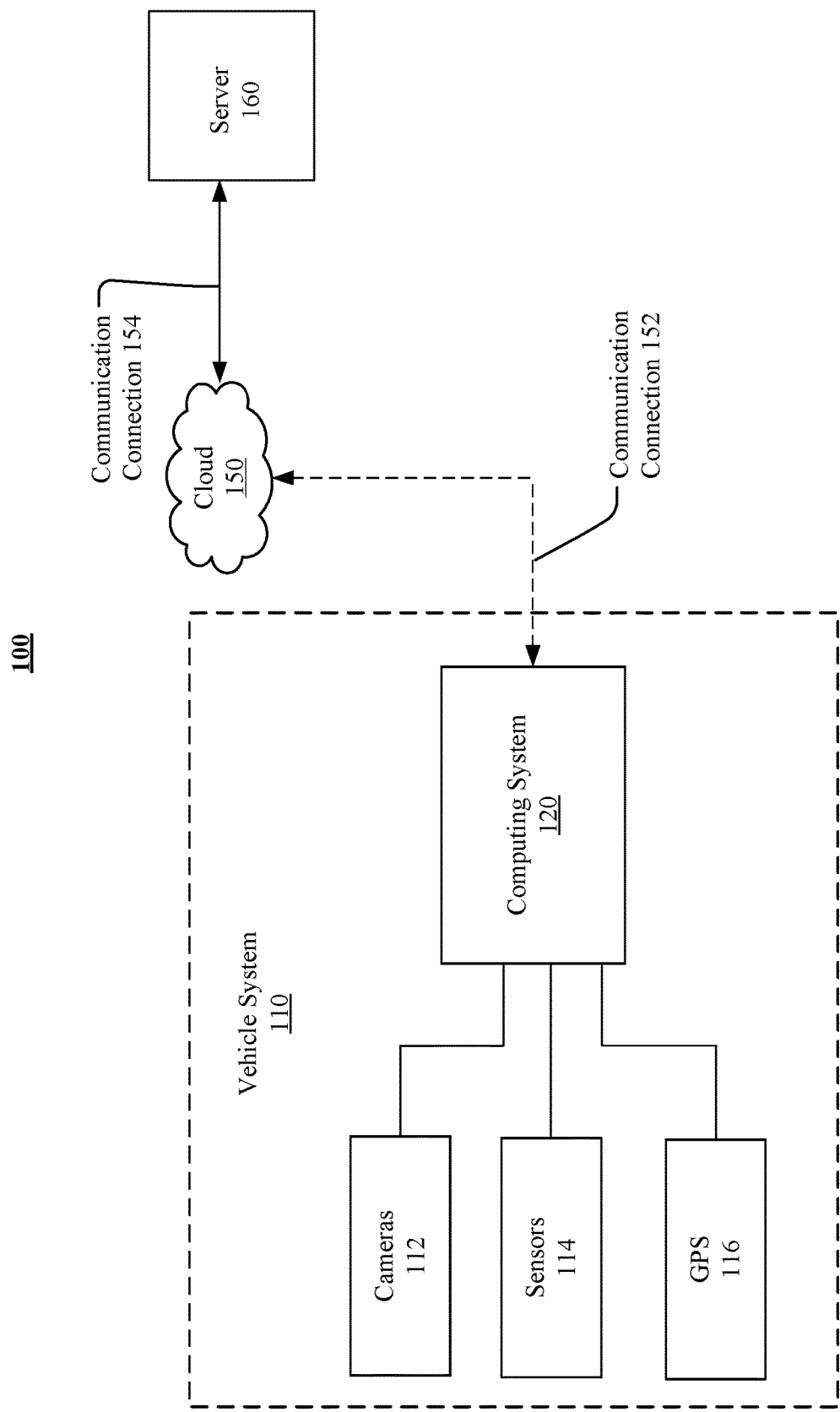
FIG. 1 illustrates an example system for calibrating images captured by vehicle cameras.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

As described above, vehicles may use cameras of various types and configurations (e.g., mobile phone cameras, dash cameras, cameras of data collection devices) to capture images or videos of surrounding environment when driving around. However, the images captured by these cameras may be unsuitable to be used in the aggregate for applications that require high accuracy and precision (e.g., building high definition maps, being used as input to a machine-learning model for object detection, object identification, or segmentation, etc.). As previously indicated, this is in part due to the fact that the collected images and videos are captured using cameras with different optical, hardware, software, and physical configurations, which may introduce different image distortion problems, including image distortion, color distortion, motion blur, rolling shutter distortion, etc. Moreover, for vehicle cameras placed within vehicles, the optical properties of the windshield may also introduce image distortion, which may vary depending on the type of vehicle camera used and its placement/orientation relative to the windshield.

To solve the aforementioned problems, particular embodiments may generate a calibration model for each vehicle camera based on a reference map (e.g., high definition map) and use the calibration model to calibrate images captured by the camera. In particular embodiments, a computing system, which may be located on the vehicle itself or on a remote server(s), may extract a number of features (e.g., an object, a corner, a shape, a pattern, a three-dimension vector, etc.) from one or more images captured by a vehicle camera. The extracted features may be associated with one or more objects captured in the images. The system may identify, in the reference map, one or more reference features (e.g., high definition features) that match (e.g., being associated with the same objects) the features extracted from the images.

The system may generate a calibration model by comparing the reference features and the features extracted from the images and may use the calibration model to calibrate images captured by the same vehicle camera under the same or similar conditions.

Particular embodiments of the system provide a technical solution to the aforementioned problems associated with having collected images or videos being captured by different vehicle cameras. By generating calibration models for individual vehicle cameras, the resulting images or videos captured by those cameras may be calibrated so that the calibrated data extracted from the images or videos may be used in the aggregate, such as for generating high definition maps or machine-learning applications. Even if the vehicles drive through areas that are unmapped by the existing high definition map, the images captured by their vehicle cameras may be calibrated based on their respective calibration models so that the resulting data may be used reliably. In addition, particular embodiments provide higher quality images by eliminating or reducing the distortions in the images and allow these images to be used for applications that require high accuracy and precision, such as, building high definition maps or object detection. Particular embodiments of the system provide improved high definition maps (e.g., higher quality with more details, expanded coverage with more covered areas) based on calibrated images captured by vehicle cameras. Particular embodiments of the system reduce the cost of building or expanding high definition maps by allowing high definition maps to be built based on images captured by widely available vehicle cameras, which could be low-end cameras or cameras that are not calibrated for distortions, rather than the expensive and precisely-mounted high-end cameras used by specialized mapping vehicles.

FIG. 1 illustrates an example system 100 for calibrating images captured by vehicle cameras. In particular embodiments, the vehicle system 110 may include or may be associated with one or more cameras 112 (e.g., a mobile phone camera, a dash camera, a data collection device camera, a safety camera, a navigation camera, or any other suitable cameras), one or more sensors 114 (e.g., LiDAR, Radar, distance sensors, etc.), one or more computing systems 120 (e.g., an embedded computing system, a data collection device, a mobile phone, a tablet, a mobile computer, a high-performance computer, etc.), a GPS sensor 116, etc. The vehicle system 110 may use the cameras 112 and sensors 114 to monitor the surrounding environment of the vehicle while driving around. For example, the vehicle system 110 may use the cameras 112 to capture a number images or videos of the surrounding environment and may use the GPS sensor 116 to collect location data associated with the captured images or videos. The computing system 120 may store the collected data at a local storage of the computing system 120 or/and transmit all or a representative portion (e.g., data process results) of data to a database in a cloud 150 through a communication connection 152. In particular embodiments, the vehicle system 110 may be associated with an autonomous vehicle, a driver-assisted vehicle, or a human driven vehicle. The vehicle system 110 may be one of a large number of vehicles which may have some vehicle constantly drive around in different areas and may provide large amount of image data with a relative low-cost.

In particular embodiments, the computing system 120 may process collected data (e.g., image data, GPS location data, timestamp, motion sensor data, etc.) and transmit the processed results to a cloud 150 through a communication connection 152. For example, the computing system 120 may detect and extract a number of features (e.g., objects, corners, shapes, sizes, three-dimensional vectors, etc.) from the images and may transmit the extracted features and related data to the cloud 150 through a wireless connection. The extracted features may have a smaller file size (e.g., by a factor of thousands) than the raw image data, and therefore may be transmitted to the cloud 150 through a wireless connection and using a limited bandwidth. The computing system 120 may collect image data with a relative high frame rate (e.g., 30 frames per second, 60 frames per second) and may constantly stream the data to the cloud 150. The extracted features and location data may be transmitted to the cloud 150 at real time, near-real-time, or at a later time. The cloud 150 may be associated with a server 160 through a communication connection 154. The server 160 may receive/access the extracted features and related data through the cloud 150. The server 160 may generate a calibration model based on the extracted features from the images and the related data (e.g., location data, sensor data) and a high definition map, which covers the locations where the images are captured. In particular embodiments, when the computing system 120 does not have internet access for a period of time, the computing system 120 may store the collected data in one or more storages or memories and may upload the data at a later time.

In particular embodiments, the computing system 120 may transmit the captured images, location data, and other related data to the cloud 150 through the communication connection 152 (e.g., wireless or wired) in real-time, near-real-time, or at a later time. For example, the vehicle system 110 may upload large amount of image data, location data, and other related data collected during one or more runs of driving to the cloud 150 or the server 160 at a data center or a maintenance center. The server 160 may access and process the image data, location data, and other related data to detect and extract the features from these images. The server 160 may generate the calibration model based on the extracted features and a high definition map which covers the locations where the images are captured.

In particular embodiments, the server may use the calibration model to calibrate any images captured by the same camera under the same or similar image capturing conditions (e.g., the same run of the vehicle, camera mounting position, view angle, camera configuration and setting, etc.). The images calibrated by the server 160 may be received from the computing system 120 through the cloud 150 (e.g., in real-time, near-real time, or at a later time). In particular embodiments, the calibration model generated by the server 160 may be transmitted to the computing system 120 associated with the cameras 112 and the vehicle system 110. The computing system 120 may use the calibration model to calibrate any images captured by the cameras 112 under the same or similar image capturing conditions. As an example, the calibration model may be particularly configured for images captured during a particular type of weather condition (e.g., sunny, rain, or snow), time of day (e.g., morning, afternoon, or evening), or geographic region (e.g., city or rural areas, etc.).

Figure 2:
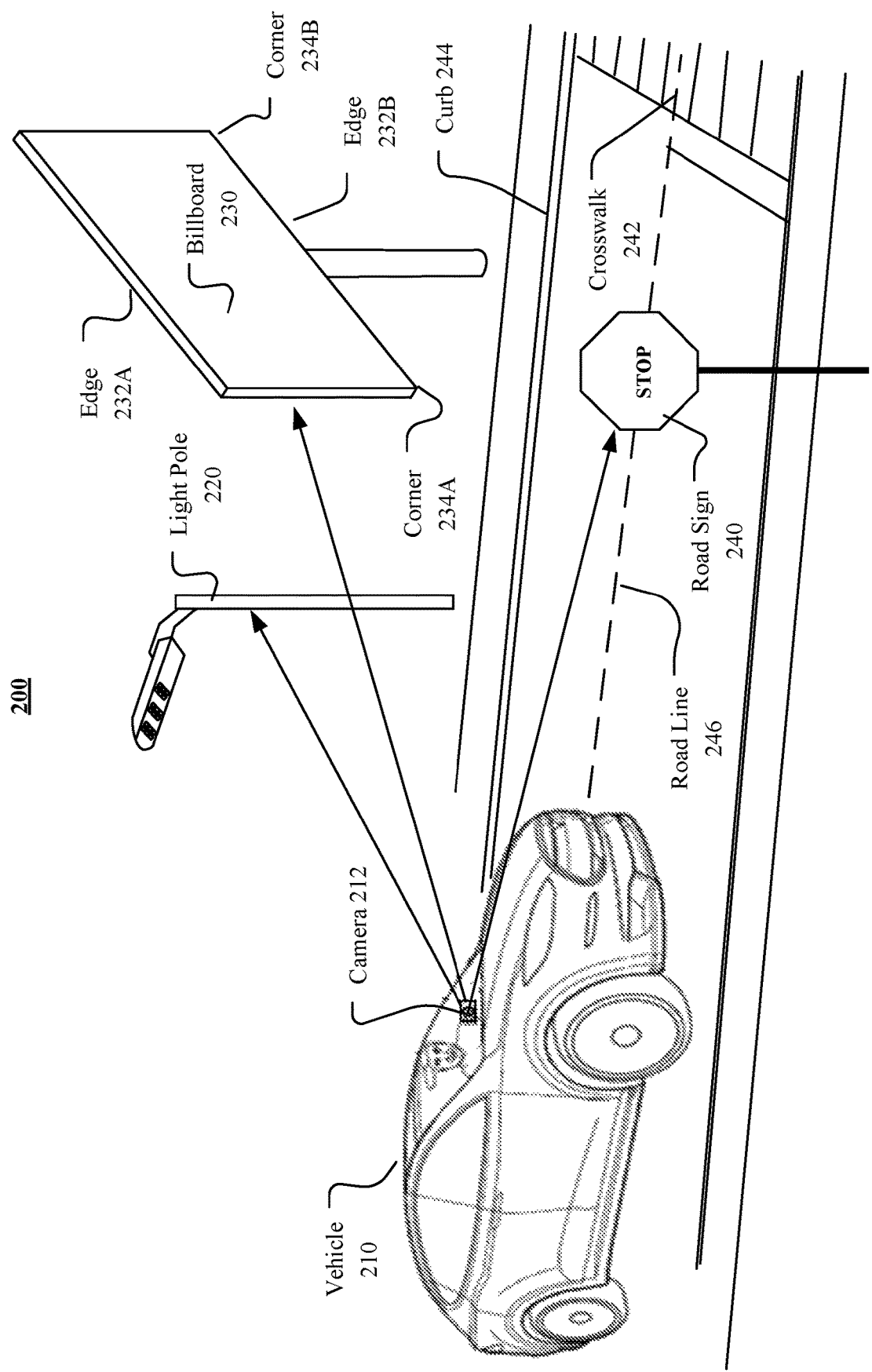
FIG. 2 illustrates an example vehicle which uses a camera to capture images of surrounding environment.

FIG. 2 illustrates an example vehicle 210 which uses a camera 212 to capture images of surrounding environment. In particular embodiments, the camera 212 may be a dash camera, a mobile phone camera, a data collection device camera, a safety camera, a navigation camera, or any other suitable cameras. In particular embodiments, the camera 212 may be a relative low-end camera (e.g., with smaller lens, lower quality, choppy trigger timing, lower cost) comparing to cameras used by a mapping vehicle specialized for capturing images for building high definition maps. The images captured by the camera 212 may include one or more types of distortions including, for example, but not limited to, camera intrinsic distortions (e.g., lens distortion, optic distortions, geometric distortions), windshield distortions, distortion caused by mounting positions (e.g., non-uniform or improper camera configurations, setting, or placements), distortions caused by view angles, color distortions (e.g., white balancing issue, chromatic aberration), rolling shutter distortions, image blurs (e.g., water on windshield), motion blurs, etc. Different cameras and different vehicles may have non-uniform distortion characteristics.

In particular embodiments, the camera 212 by itself may be not capable of generating images without distortions. The images captured by the camera 212 may be unsuitable for applications that require high accuracy and precision such as building high definition maps. In particular embodiments, the properties and setting of the camera 212 may be unknown to a server in a cloud and may vary from time to time. For example, when the camera 212 is reinstalled on the dash of the vehicle 210, the properties and setting of the camera 212 may change accordingly. When the images captured by a camera are calibrated by a calibration model as described in this disclosure, the calibration model may be applied to images captured by the same camera and under the same or similar image capturing conditions (e.g., the same run of driving without re-installation of the camera, the same properties and setting, etc.).

In particular embodiments, when the camera's image capturing conditions have changed, the system may regenerate another calibration model under new image capturing conditions. For example, the system may detect, using an accelerometer associated with the camera, that the camera has been taken off an original mounting position and is reinstalled, the system may regenerate the calibration model for the camera or re-calibrate the parameters of the calibration model (when the vehicle drives through a high definition area) because the camera may have a different mounting position or view angle after the reinstallation. As another example, the system may determine that the configuration or setting of the camera has been changed (e.g., picture mode, lens focal distance, frame rate, etc.) as indicated by the configuration/setting data or metadata associated with the camera or the captured images. The system may regenerate the calibration model or update the calibration model's parameters under the new configuration or setting. As another example, the system may detect than the windshield has some water because of rain and may regenerate the calibration model for the camera or recalibrate the calibration model parameters. As another example, the system may detect changes of other image capturing conditions (e.g., lighting conditions, road conditions) and may determine to regenerate the calibration model or recalibrate the calibration model parameters. As another example, the system may detect that the vehicle starts a new run of driving and may determine to regenerate the calibration model or recalibrate the calibration model parameters for the camera.

In particular embodiments, the camera 212 may capture a number of images or videos for the scenes in the surrounding environment of the vehicle 210. The captured images may include a number of objects in the surrounding environment, for example, a light pole 220, a billboard 230, a road sign 240, a crosswalk 242, a road line 246, a curb 244, etc. The objects captured in the images may be associated with one or more features. For example, the billboard 230 may be associated with multiple corners (e.g., 234A, 234B), multiple edges (e.g., 232A, 232B), a surface size, a direction of an edge, etc. As another example, the road sign 240 may be associated with a height, a shape, a content on the sign, a distance to road curb, etc. As another example, the crosswalk 242 may be associated with a pattern with multiple parallel lines. The road line 246 may be associated with a pattern of dash-line. The objects and the related features may be described by one or more geometric elements, for example, a line, a surface, a volume, a shape, a two-dimensional vector, a three-dimensional vector, a dot, an angle, a converging point, a pattern, etc.

In particular embodiments, the vehicle 210 may use a computing system to process the captured images, and to detect/extract a number of features from the captured images. In particular embodiments, the featured may be detected using one or more feature detectors which may classify the features into one or more classifications. In particular embodiments, a feature may be associated with a number of pixels and a descriptor. To detect a feature from an image, the computing system may first identify a group of pixels in the image (e.g., pixels associated with a corner, an edge, a shape, an object, etc.) and one or more associated attributes of the pixels (e.g., patterns, positions, areas, colors, etc.). Then, the computing system may classify the group of pixels into one or more classifications using the descriptor based on the pixels and the associated attributes. In particular embodiments, the extracted features may include, for example, but are not limited to, an object, a dimension of an object, a size of an object, a surface of an object, a corner of an object, an edge of an object, a relation of two or more objects, a line, a direction of a line, a length of a line, a curve, a pattern, a shape, a point, a group of points in a three-dimensional space, a converging point, a distance, a view angle, a two-dimensional vector, a three-dimensional vector, a color, a color distribution, a lighting condition, a relation of two or more features, etc. The extracted features may be compared to corresponding reference features (e.g., high definition features) for generating the calibration model, as will be described later in this disclosure.

In particular embodiments, a feature extracted from an image may include a number of two-dimensional vectors or/and three-dimensional vectors in an area of interest in the image. The computing system may firstly identify the area of interest associated with the feature. For example, the computing system may determine a point of interest in the image and determine an area around the point of interest using a particular geometric shape (e.g., a circle, a square, a triangle, a polygon, etc.) and with a particular size. In particular embodiments, the computing system may determine a number of point pairs based on one or more rules and the geometric shape of the area of interest. Each point pair may include a point and an opposite point. For example, for an edge line, the points and the respective opposite points may be located at different side of the edge line. The two-dimensional or three-dimensional vectors may be determined based on the difference between the pixel value at these points and respective opposite points. For example, the computing system may subtract the values at these points to the values at respective opposite points to determine the corresponding two-dimensional or three-dimensional vectors. The two-dimensional or three-dimensional vectors may only have relative small changes when the images are captured under different lighting conditions, and therefore may be reliably used to identify, compare, and calibrate the associated features.

In particular embodiments, each image captured by the camera 212 may be associated with a GPS location as determined by a GPS sensor of the vehicle 210 to indicate where the image is captured. The GPS location together with the image itself may be used to determine relative positions (e.g., distances, directions) of objects or features in surrounding environment with respect to the vehicle 210. For example, the distance and geometric relationship between the vehicle 210 and the billboard 230 may be determined based on one or more images captured by the camera 212 using computer vision algorithms. The accurate location of objects or features captured in the image may be further determined based on the relative positions and the GSP location of the vehicle 210. The location information may be used to identify areas in high definition maps that contain the high definition features matching the features extracted from the images.

In particular embodiments, the vehicle 210 may localize itself with respect to one or more objects in the surrounding environment. For example, the vehicle 210 may determine the precise position of the billboard 230 based on one or more images captured by the camera 212. The vehicle 210 may further determine, from multiple view angles, precise geometric properties (e.g., a corner position, a corner angle, an edge direction, an edge length, etc.) of the billboard 230 in the three-dimensional space based on a high definition map, calibrated images, or/and uncalibrated images captured by the camera 212. The geometric properties of the billboard 230 may be determined with respect to the vehicle pose. The vehicle 210 may determine its own position in the three-dimensional space based on the GPS location and the precise geometric properties of one or more objects in the surrounding environment. In particular embodiments, the position of the vehicle 210 or an object in the surrounding environment may be determined with accuracy and precision at one-centimeter level. In particular embodiments, vehicle 210 may determine its location using, for example, a GPS sensor, simultaneous location and mapping (SLAM), visual SLAM, dead reckoning, or other localization techniques.

Figure 3:
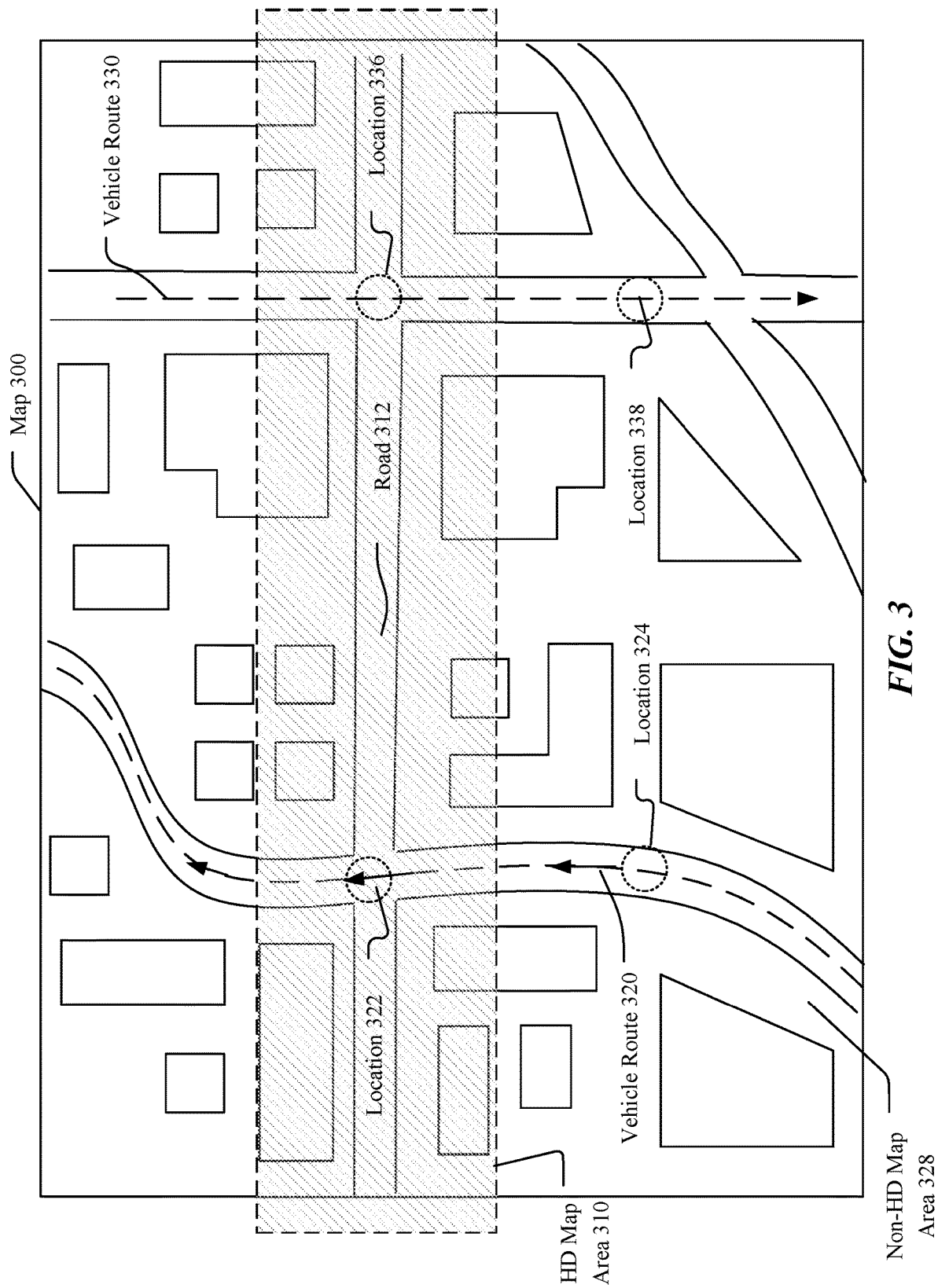
FIG. 3 illustrates an example reference map which includes a high definition map area used to generate a calibration model for calibrating vehicle cameras when the vehicle drives through the high definition map area.

FIG. 3 illustrates an example reference map 300 which includes a high definition map area 310 used to generate a calibration model for calibrating vehicle cameras when the vehicle drives through the high definition map area 310. In particular embodiments, the reference map may be a high definition map including the high definition map area 310. As an example and not by way of limitation, a high definition map may be more accurate (e.g., accurate to within 1-10 millimeters or centimeters) than a non-high definition map (e.g., accurate to within 1-10 meters). As another example, a high definition map may include or be generated from higher resolution data. For example, a high definition map may include or be generated from 8-10 megapixel images or dense point clouds measured by LiDARs with 8-12 points-per-meter (ppm) nominal point spacing. In contrast, a non-high definition map may include or be generated from 3-5 megapixel images or point clouds measured by LiDARs with 1-4 ppm nominal point spacing. As another example, the high definition map may include more environmental details (e.g., in addition to road data, it may also include objects, patterns, features, buildings, curbs, street signs, trees, and 3D depth information of the surrounding) than the non-high definition map (e.g., it may only have traditional 2D road data). These environmental details in the high definition map may have been calibrated for real-world environment for eliminating or reducing distortions caused by environmental factors (e.g., a camera's lens parameters and mounting position or angle, windshield, weather, etc.). In addition, these environmental details may have a higher measurement accuracy (e.g., accurate to within 1-10 millimeters or centimeters) than those in non-high definition map (e.g., accurate to within 1-10 meters). The high definition map may be generated based on images captured by specialized cameras or distortion calibrated cameras equipped on mapping vehicles. The specialized cameras or distortion calibrated cameras may include, for example, high-quality cameras (e.g., ns level high precision timing, high-quality lens), stereo cameras, high resolution cameras, high speed cameras, multi-camera systems, cameras calibrated for distortions, or any suitable cameras with less distortions. The high definition map may be generated further based on high precision environmental sensor data (e.g., distance or depth measured by LiDARs or radars) collected by mapping vehicles. The images captured by the cameras of the mapping vehicles may have higher degree of detail and higher quality (e.g., higher accuracy, higher precision, less distortions) than the images captured by other cameras (e.g., low-end cameras, low-quality cameras, cameras uncalibrated for distortions) that are used by non-mapping vehicles.

In particular embodiments, the high definition map may include a number of high definition images and high definition features. The high definition images and features may include higher degrees of environmental details with higher accuracy and precision (e.g., accurate to within 1-10 millimeters or centimeters) than images and features in non-high definition maps (e.g., low definition maps that are accurate to within 1-10 meters). As an example and not by way of limitation, a high definition image may have a higher image resolution (e.g., 1024×768, 1280×960, 1536×1180, 1600× 1200, 2048×1536 or any higher resolutions) than a non-high definition image (e.g., 800×600, 640×480, 320×240). It is notable that the image resolutions of the high definition images and non-high definition images are not limited to these examples.

In particular embodiments, the system may use reference images or/and reference features from the high definition map to calibrate the extracted features from uncalibrated images, which refer to images captured by a camera that has not been calibrated for the environment context in which the camera is placed (e.g., position/orientation of the camera's placement, the windshield, the lighting condition within a car, etc.). The reference images may have less distortions than the uncalibrated images because they have been calibrated to the real-world environment. The reference features may have higher accuracy and precision than the features extracted from the uncalibrated images (e.g., the reference features may be accurate to within 1-10 centimeters rather than to 1-10 meters). In particular embodiments, a reference image may be used to calibrate an uncalibrated image as long as the reference image has less distortion than the uncalibrated image regardless of the image resolution relationship between the reference image and the uncalibrated image (e.g., the reference image could have higher, lower or the same image resolution with the uncalibrated image).

High definition maps may provide high degree of details with high accuracy and precision for the covered areas. However, because the limitation in the resources (e.g., mapping vehicles, mapping equipment, time) that are needed for building high definition maps, there are large number of areas, where high definition maps are needed, that are not covered by high definition maps. Particular embodiments of the system address this problem by utilizing the widely available cameras used by vehicles other than the specialized mapping vehicles. By generating calibration models based on high definition maps, particular embodiments of the system allow the widely available images captured by non-mapping vehicle cameras to be calibrated for distortions and to be used for building high definition maps. Therefore, particular embodiments of the system provide a technical solution which allows high definition maps to be built at a lower cost and at a higher speed that are impossible before.

In particular embodiments, the system may generate a calibration model for cameras used by a vehicle when the vehicle drives through an area covered by high definition maps. As an example and not by way of limitation, the high definition map area 310 may be along the road 312 and all other areas in the map 300 beyond the area 310 may be not covered by any high definition maps. The vehicle may drive in different areas in the map 300 while capturing images of surrounding environment using cameras that are not calibrated for image distortions. The vehicle may further collect associated location data using a GPS sensor and other data related to, for example, timestamp, road conditions, vehicle moving status, speed, moving direction, weather conditions, etc. The captured images may be processed by a vehicle computer to extract a number of features related to one or more objects captured in the images. The extracted features, location data, and other related data may be transmitted to a cloud and processed by a server in real time or near-real time. When the vehicle drives along the vehicle route 320 (as indicated by the arrows along the route 320) and enters the high definition map area 310 from the non-high definition map area 328, the server in the cloud may access the map 300 and the high definition map area 310 to determine that the vehicle has entered the high definition map area 310. The server may search the high definition map area 310 in one or more areas that are close to the current location of the vehicle (e.g., location 322) and identify one or more reference features that match the features extracted from the images captured by the vehicle cameras. The server may generate a calibration model for the cameras used by the vehicle by comparing the features extracted from the images and the corresponding reference features matching the extracted features. In particular embodiments, the reference features may include one or more high definition features in the reference map.

In particular embodiments, the calibration model may be further calibrated when the vehicle drives through other areas covered by any high definition maps after the calibration model being generated. As an example and not by way of limitation, the vehicle may drives along the route 330 in the map 300 and pass through the high definition map area 310 a second time. The server may identity that the vehicle has entered an area associated with locations covered by high definition maps. The server may identify corresponding reference features associated with these locations and matching the features extracted from images. The server may re-calibrate one or more parameters associated with the calibration model using the newly identified reference features. The calibration model may have improved accuracy and precision after being recalibrated. In particular embodiments, the server may recalibrate or improve the calibration model each time when the vehicle drives through an area covered by a reference map and when the server can identify matching reference features corresponding to features extracted from the images captured by the vehicle camera.

To identify the reference features that match the features extracted from the images, the information in the reference map may need to be relevant to the current scenes captured in the current images. For example, the reference map may contain information about the same buildings, road directions, or other objects captured in the current images. The lighting conditions in the reference map and current images may need to allow the corresponding features to be matched. Otherwise, if the scene in the reference map is different from the scene captured in current images, the sever may not able to identify the matching reference features in the reference map. In particular embodiments, the server may generate a calibration model based on the reference map only when the information contained in the reference map is generated or updated within a threshold time period (e.g., several days, 1 weeks, several weeks) from the time (e.g., the current time) when the current images are captured.

In particular embodiments, the generated calibration model may be used to calibrate any images captured by the same camera and under the same or similar image capturing conditions. As an example and not by way of limitation, the calibration model may be used to calibrate images captured by the same camera at locations (e.g., location 324, location 338) which are not included in the high definition map area 310. The images captured at locations beyond the high definition map area 310 may be used for expanding high definition maps to these areas after being calibrated. As another example, the calibration model may be used to calibrate images captured at locations covered by the high definition map area 310 (e.g., location 322, location 336). The calibrated images associated with locations covered by the high definition map area 310 may be used to improve or update (e.g., adding new objects, updating changed objects) the reference map at these locations. As another example, the calibration model may be used to calibrate the images that are captured before or after the time when the calibration model is generated (as long as the images are captured by the same camera and under the same or similar image capturing conditions).

Figure 4B:
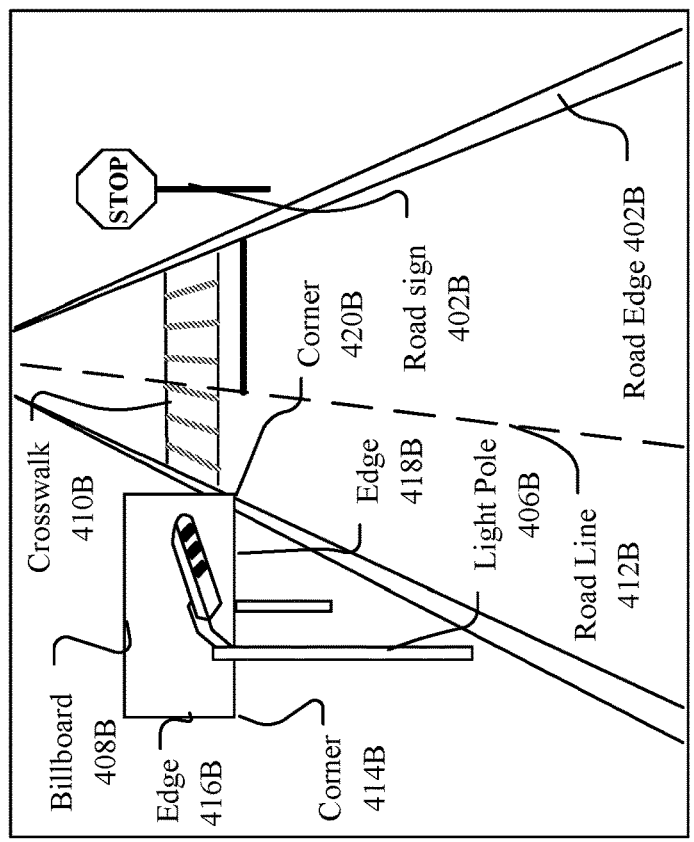
FIG. 4B illustrates an example high definition image associated with a reference map.
Figure 4A:
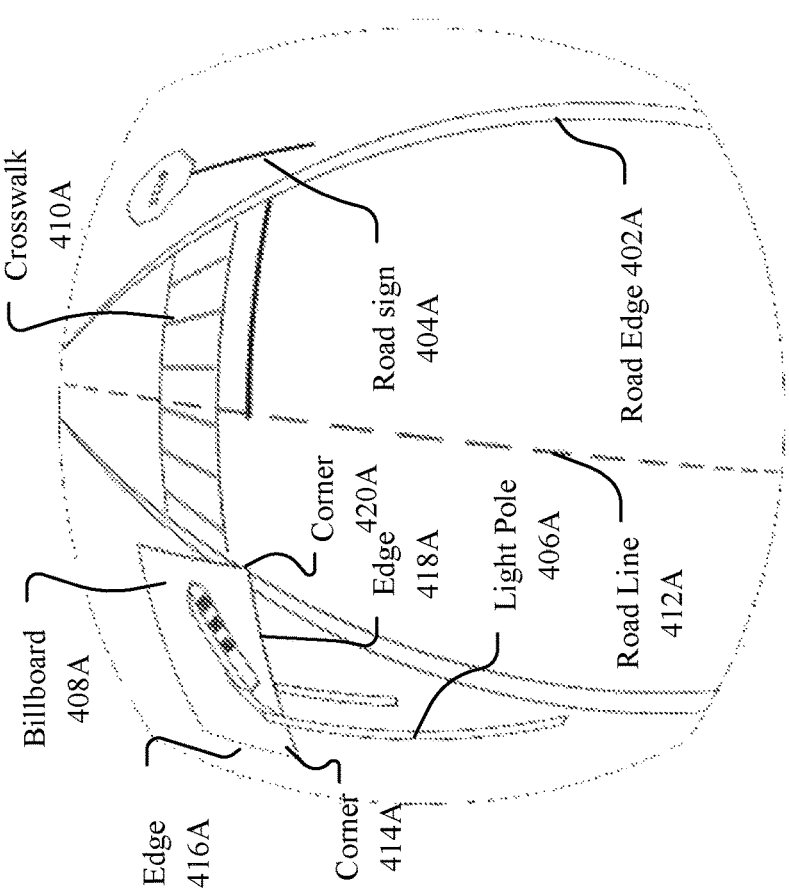
FIG. 4A illustrates an example uncalibrated image captured by a vehicle camera which is not calibrated for image distortion.

FIG. 4A illustrates an example uncalibrated image 400A captured by a vehicle camera which is not calibrated for image distortion. FIG. 4B illustrates an example high definition image 400B associated with a reference map and corresponding to the image 400A. The image 400A and the high definition image 400B may include a number objects corresponding to each other, for example, a road edge 402A and 402B, a road sign 404A and 404B, a light pole 406A and 406B, a billboard 408A and 408B, a crosswalk 410A and 410B, a road line 412A and 412B, etc. The image 400A may include distortions caused by camera lens, camera mounting positions, view angles, windshields, etc. The high definition image 400B associated with the reference map may provide higher degree of detail, higher accuracy and precision, and less distortions than the image 400A.

In particular embodiments, the computing system on the vehicle may extract a large number of features from the images while the vehicle drives around. For example, the vehicle may use the camera to capture images at 30 frames or 60 frames per second and the vehicle may generate millions of extracted features from the images. In particular embodiments, the computing system on the vehicle or the server may use an optimization algorithm to optimize the extracted features and select the extracted features based on one or more criteria, and the selected features may be compared to the reference features in the reference map.

In particular embodiments, the server may identify that the high definition image 400B is corresponding to the same scene that is captured in the image 400A based on GPS locations associated with image 400A and 400B or/and comparison results using computer vision algorithms (e.g., object recognition, pattern recognition). In particular embodiments, a number features associated with one or more objects in the image 400A may be extracted and transmitted to a server in a cloud. The server may have access to a reference map which include the high definition image 400B. The server may identify one or more reference features which are associated with the high definition images 400B and match the features extracted from the image 400A. The matching reference features and features extracted from the distorted images may be corresponding to the same object(s) in the surrounding environment. For example, the server may identity that the billboard 408B in the high definition image 400B and the billboard 408A in the image 400A are corresponding to the same billboard in the vehicle surrounding environment. As another example, the server may identify that the curved road edge 402B in the high definition image 400B is corresponding the road edge 402A in the image 400A. In particular embodiments, the server may identify at least one matching feature or object in a high definition image as along as the scenes captured by the two images have overlap covering the at least one matching feature or object.

In particular embodiments, each of the features extracted from the one or more images may be associated with a feature descriptor. In particular embodiments, the descriptors associated with the features may be agnostic to scale or/and orientation. Each of the reference features may be associated with a reference feature descriptor (e.g., a high definition feature descriptor). The corresponding reference features may be identified by matching the descriptors of the features extracted from the images to the corresponding descriptors of the reference features. As an example and not by way of limitation, the computing system on vehicle may identify, in the distorted image 400A, a group of pixels associated with the corner 414A of the billboard 408A based on one or more characteristics, such as, the converging point of two edges 416A and 418A, the color/brightness difference cross the associated edges (e.g., 416A, 418A), the angular shape or pattern, etc. Once the pixels associated with the corner 414A have been identified, the computing system on vehicle may extract descriptors from these pixels based on the characteristics of the corner 414A. The corner 414A may be detected from one or more viewpoints or view angles when the relative position of the vehicle changes with respective to the billboard 408A. The extracted features as described by the corresponding descriptors may be transmitted to a sever, together with GPS location data, timestamp data, or other related data. The server may use the extracted features and associated data to identify the corner 414B and 420B as the reference features that match the corner 414A and 414A, respectively.

In particular embodiments, the reference map may be a high definition map including a number of high definition images. The server may identify, in the high definition map, the high definition image 400B that is corresponding the image 400A. The high definition image 400B may be identified by comparing its associated GPS location to the GPS location associated with the image 400A or/and by comparing the content of the images 400A and 400B based on computer vision algorithms (e.g., object recognition, pattern recognition). And, the server may perform a similar descriptor extracting process on the high definition image 400B to detect the reference features (e.g., the corner 414B) and extract the corresponding descriptors.

In particular embodiments, the server may identify the reference features (e.g., high definition features) that match the features extracted from the images by directly comparing the descriptors of features extracted from the images and the descriptors of one or more reference features in a reference map (without identifying the corresponding high definition images). The reference map may be a high definition map including a number of high definition features associated with corresponding GPS locations. The high definition features in the high definition map be pre-extracted and stored in the high definition map. The server may directly compare a descriptor associated with a feature (e.g., corner 414A, 420A) extracted from the distorted images (e.g., image 400A) and a number of high definition features (e.g., corner 414B, corner 420B) that are within a threshold distance to the GPS location associated with the extracted feature. For example, the server may firstly identify the corners 414B, 420B, and a number other high definition features that are within a threshold distance to the GPS location of the corner 414A. Then, the server may compare the descriptor of the corner 414A to the descriptor of each high definition feature within the threshold distance and identify the corner 424B as the high definition feature that match the corner 414A.

In particular embodiments, the server may generate a calibration model by comparing the disagreement between the reference features (e.g., high definition features) and the corresponding features extracted from the distorted images. The reference features and features extracted from distorted images may be corresponding to the same object(s) but may have some disagreement in one or more aspects. For example, the curve associated with the road edge 402A in the image 400A may be corresponding the straight line associated with the road edge 402B in the high definition image 400B. As another example, the corner 414A associated with the billboard 408A may have a different angle from the corresponding corner 414B in the high definition image 400B. As another example, the road sign 404A and 404B may have different height and shape in the two images of 400A and 400B. As another example, the crosswalk 410A and 410B may have different pattern in the two images (as the crosswalk 410A being bended by the distortion). As another example, one or more objects in the reference map may have a color or a color distribution that is different from the corresponding objects captured in the images. The server may compare the disagreements of these matching features and generate a calibration model based on the comparing results.

In particular embodiments, the system may generate a calibration model with a number of parameters which have undetermined initial values. The system may gradually determine the values of the parameters by comparing the features extracted from distorted images and the corresponding reference features (e.g., high definition features) in the reference map (e.g., high definition map). In particular embodiments, one or more parameters associated with the calibration model may be further recalibrated or adjusted to allow the calibration model to have better accuracy and precision. In particular embodiments, the calibration model may be based on a number of mathematical or/and geometrical rules that could be used to calibrate the distorted features according to the reference features (e.g., high definition features).

In particular embodiments, the system may use bundle adjustment to calibrate the distorted images for removing or eliminating geometric distortions, and to determine three-dimensional coordinates describing the scenes of the surrounding environment. The system may use a set of images depicting a number of three-dimensional points from one or more viewpoints. The three-dimensional points may be associated with one or more objects in the scenes of the surrounding environment captured in the images. The system may simultaneously refine the three-dimensional coordinates describing the scene geometry, the parameters of the relative motion, and the optical characteristics of die camera(s) used to acquire the images, based on one or more optimality criteria involving the corresponding image projections of all points. The calibrated images and the refined three-dimensional coordinates may provide higher accuracy and precision in describing the scene geometry than the distorted images, and therefore may be used to build high definition maps.

In particular embodiments, the calibration model may include a number of parameters related to color and brightness distortions of the images (e.g., white balancing, over exposure, under exposure, brightness difference caused by different lighting conditions). For example, the calibration model may perform a color normalization to calibrate the images color distortions. As another example, the calibration model may use a Gamma curve associated with one or more channels of the image to calibrate the brightness the images. As another example, the system may use a machine-learning model to convert day-time images into night-time images or convert night-time images into day-time images. In particular embodiments, the images may be firstly calibrated for color or/and brightness before being further processed (e.g., feature extractions, object recognition, geometric calibration) to enable more accurate and precise processing results. In particular embodiments, the descriptors associated with the features and the calibration model may be agnostic to color or/and brightness.

In particular embodiments, the computing system on the vehicle or the server may determine that one or more images captured by the camera contain motion blurs and may exclude the images with motion blurs from being used in generating the calibration model or building high definition maps. In particular embodiments, the computing system on the vehicle or the server may determine that one or more images have over exposure or under exposure problem and may exclude these images from being used in generating the calibration model or in building high definition maps.

In particular embodiments, the calibration model may be used to calibrate image distortion caused by rolling shutter effect. In particular embodiments, the camera used by the vehicle may capture an image line by line, similar to a rolling shutter camera, instead of capturing the whole image at the same time. Each line of an image may be captured at a slightly different time. When the vehicle and an object in the scene move with respect to each other, the image captured in this line-by-line manner may become unpredictable because of the rolling shutter effect. In particular embodiments, the system may determine the relative motion between the object and the vehicle. For example, the vehicle may use one or more sensors (e.g., a speed sensor, an accelerometer, a gyroscope sensor, etc.) to determine the vehicle speed and moving direction. The system may determine that the object of issue is a non-moving object (e.g., a building, a light pole, a billboard, etc.) and the rolling shutter effect of the image is caused by the motion of the vehicle. Then, the calibration model may calibrate the rolling shutter distortion in the image based on the vehicle speed, moving direction, frame rate of the camera, or/and a model for calculating rolling shutter effect. When the object is a moving object in the surrounding environment, the system may estimate the object motion (e.g., using computing version algorithms) relative to the vehicle and calibrate the rolling shutter distortion based on the estimated object motions. In particular embodiments, the system may use data extracted from large number of images to improve the accuracy and precision of the calibration model for calibrating rolling shutter effect.

Figure 5:
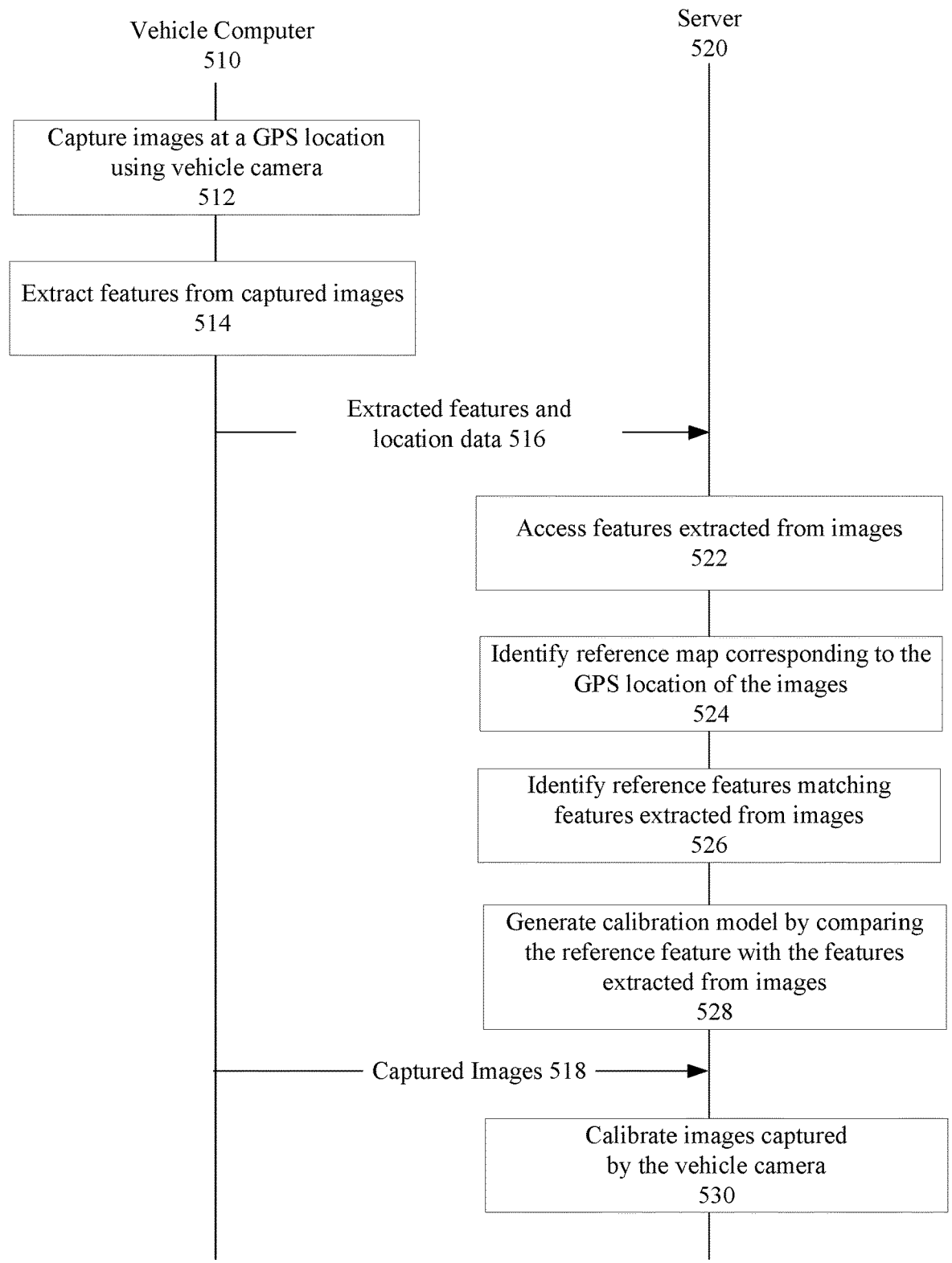
FIG. 5 illustrates example processes for calibrating distorted images captured by a vehicle camera

FIG. 5 illustrates example processes for calibrating distorted images captured by a vehicle camera. In particular embodiments, at step 512, the vehicle system may use a vehicle computer 510 to collect image data from one or more cameras and collect GPS data from a GPS sensor associated with the vehicle. At step 514, the vehicle computer 510 may extract a number of features from the captured images and transmit the extracted features and related GPS location data 516 to a server 520 (e.g., through a cloud). Because the data of extracted features has smaller file size than the image data, the extract features and location data may be transmitted through a wireless connection using a limited bandwidth. At step 522, the server may access the features extracted from the images and the related location data, for example, from a cloud storage associated with the server 520 or a storage of the server itself. In particular embodiments, the server 520 may receive the extracted features and location data 615 from the vehicle computer 510 in real-time or near-real-time. At step 524, the server 520 may identify the reference map (e.g., high definition map) that covers the area corresponding to the locations where the images are captured. At step 526, the server 520 may identify one or more reference features (e.g., high definition features) in the reference map and associated with the same object(s) that are associated with the features extracted from the images. At step 528, the server 520 may generate a calibration model by comparing the features extracted from the images and the reference features that match the features extracted from images. At step 530, the server 520 may use the calibration model to calibrate images captured by the same camera under the same or similar imaging capturing conditions.

In particular embodiments, the images that are calibrated on the server 520 may be received by the server 520 from the vehicle computer 510 in real-time, near-real-time, or at a later time with respect to when the image are captured. For example, the vehicle computer 510 may send the captured images 518 to the server 520 in real-time or near-real-time while the images are captured, or after the vehicle has finished one or more rounds of data collection (e.g., at a maintenance center or at a data center). In particular embodiments, the calibration model generated on the server 520 may be transmitted to the vehicle computer 510. The vehicle computer 510 may use the calibration model to calibrate any images captured by the same camera and under the same or similar image capturing conditions.

Figure 6:
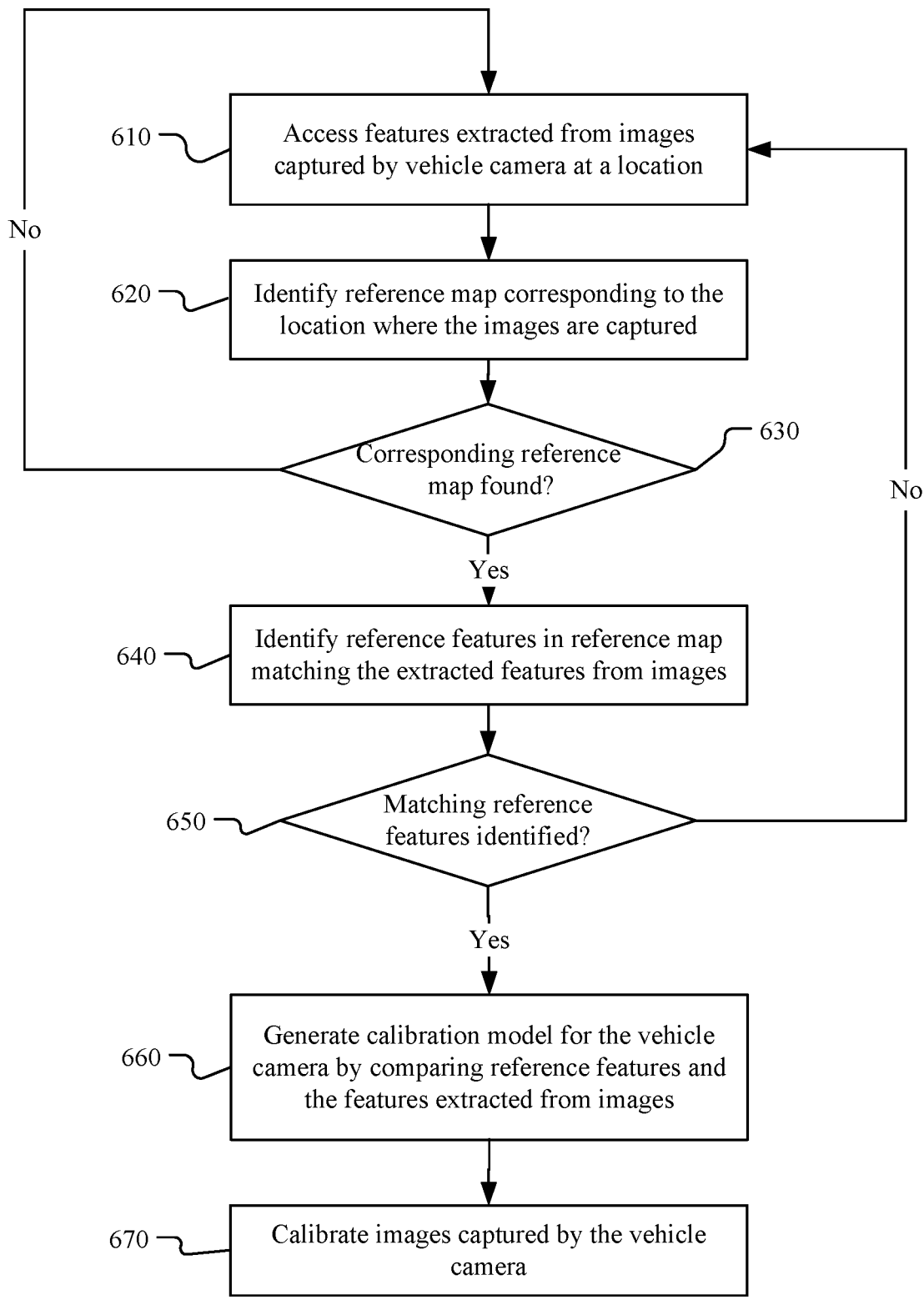
FIG. 6 illustrates an example method for calibrating distorted images using a calibration model generated based on a reference map.

FIG. 6 illustrates an example method 600 for calibrating distorted images using a calibration model generated based on a reference map. In particular embodiments, the reference map be a high definition map including high definition features and images. The high definition map may provide higher degree of details and higher accuracy and precision than non-high definition map (e.g., traditional road maps with lower precision and/or lacking three-dimensional information about road features). The method may begin at step 610, where a server may access a number of features extracted from one or more images captured by a camera associated with a vehicle. These images for extracting the features may be uncalibrated images and the camera used for capturing these uncalibrated images may have not been calibrated for an environment surrounding the camera. The camera used for capturing these uncalibrated images may have one or more distortion problems due to, for example, quality of camera, lens properties, mounting positions, windshields, etc. The images may be captured at a particular location identified by a GPS sensor of the vehicle. The features extracted from the images may be associated with one or more objects in the scenes captured in the images. At step 620, the server may identify a reference map corresponding to the location where the uncalibrated images are captured. The reference map may be generated based on images captured by cameras that are calibrated for distortions and used by specialized mapping vehicles. In particular embodiments, the reference map may be a high definition map generated based on high accuracy and high precision sensor data (e.g., LiDAR data, radar data) collected by the mapping vehicles. The high definition map may provide a higher degree of detail with higher accuracy and precision than the images captured by the uncalibrated cameras. The server may check if any high definition maps cover the areas at the location where the images are captured and identify the corresponding high definition map. For example, the server may determine a location where the images are captured. The location may be the vehicle location as indicated by a GPS sensor when the captured are captured. The server may determine that this location is covered by the high definition map based on a determination that the vehicle location is within a threshold distance to a location identified in the high definition map.

At step 630, if the server determines that there is no reference map that covers the areas corresponding the location where the images are captured, the method may jump to the step 610 to access extracted features associated with other locations while the vehicle drives around. At step 640, when the server has identified the reference map that covers the areas corresponding to the location where the images are captured, the server may identify, in the reference map, one or more reference features (e.g., high definition features) matching one or more of the features extracted from the images. The matching reference features and the features extracted from the images may be associated with the same object(s) in the scene captured in the images. The reference features may include high definition features in the high definition map areas and may provide a higher degree of detail with higher accuracy and precision than the features extracted from the images.

At step, 650, if the server has identified no reference features that match the features extracted from the images, the method may jump to step 610 for accessing features extracted from images which are captured at other locations. At step 660, if the server has identified the matching reference features that are associated with the same object(s) to the features extracted from the images, the server may generate a calibration model for the camera by comparing the reference features and the features extracted from the images. The reference features and the features extracted from the images may have one or more disagreements. The server may determine the values for a number of parameters associated with the calibration model by comparing the disagreements between the reference features and the features extracted from the images. At step 670, the server may use the calibration model with a number of parameters to calibrate any images captured by the same camera under the same or similar image capturing conditions. The image distortion that are calibrated may relate to, for example, but not limited to, a geometric property of the first camera, a windshield, a mounting position, a mounting angle, a view angle, a white balancing issue, a rolling shutter, a color issue, etc.

In particular embodiments, the images that are calibrated using the calibration model may be captured at locations that are not within the high definition map areas in any reference maps, and the calibrated images associated with these locations may be used to expand the high definition areas of the reference map into the areas at these locations. In particular embodiments, the images that are calibrated using the calibration model may be captured at locations that are within a high definition map area, and the calibrated images associated with locations may be used to improve (e.g., more details, higher accuracy, higher precision) in that high definition map area covering these locations.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for calibrating distorted images using a calibration model generated based on a high definition map including the particular steps of the method of FIG. 6, this disclosure contemplates any suitable method for calibrating distorted images using a calibration model generated based on a high definition map including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
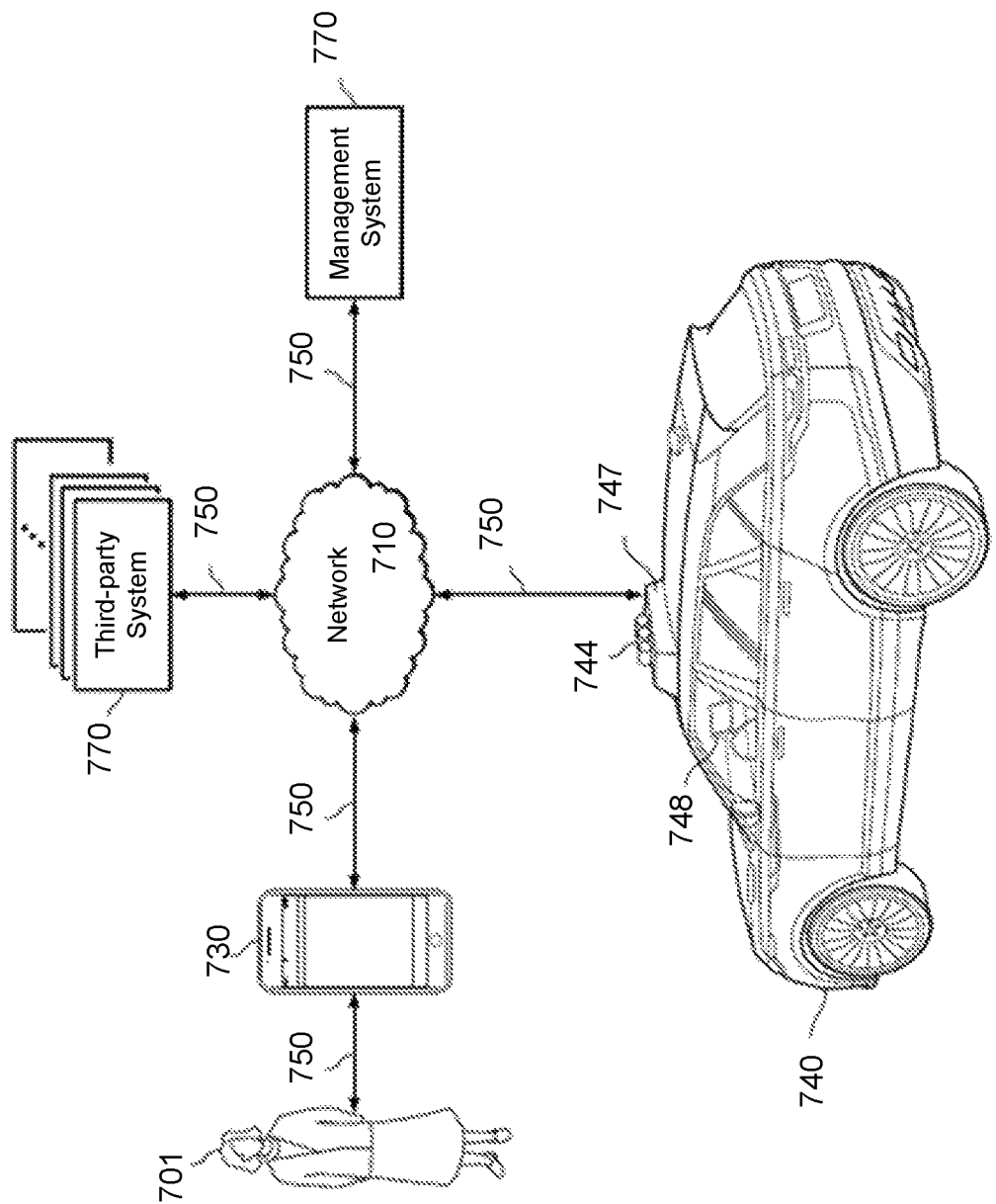
FIG. 7 illustrates an example block diagram of a transportation management environment for matching ride requestors with autonomous vehicles.

FIG. 7 illustrates an example block diagram of a transportation management environment for matching ride requestors with autonomous vehicles. In particular embodiments, the environment may include various computing entities, such as a user computing device 730 of a user 701 (e.g., a ride provider or requestor), a transportation management system 760, an autonomous vehicle 740, and one or more third-party system 770. The computing entities may be communicatively connected over any suitable network 710. As an example and not by way of limitation, one or more portions of network 710 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 7 illustrates a single user device 730, a single transportation management system 760, a single vehicle 740, a plurality of third-party systems 770, and a single network 710, this disclosure contemplates any suitable number of each of these entities. As an example and not by way of limitation, the network environment may include multiple users 701, user devices 730, transportation management systems 760, autonomous-vehicles 740, third-party systems 770, and networks 710.

The user device 730, transportation management system 760, autonomous vehicle 740, and third-party system 770 may be communicatively connected or co-located with each other in whole or in part. These computing entities may communicate via different transmission technologies and network types. For example, the user device 730 and the vehicle 740 may communicate with each other via a cable or short-range wireless communication (e.g., Bluetooth, NFC, WI-FI, etc.), and together they may be connected to the Internet via a cellular network that is accessible to either one of the devices (e.g., the user device 730 may be a smartphone with LTE connection). The transportation management system 760 and third-party system 770, on the other hand, may be connected to the Internet via their respective LAN/WLAN networks and Internet Service Providers (ISP). FIG. 7 illustrates transmission links 750 that connect user device 730, autonomous vehicle 740, transportation management system 760, and third-party system 770 to communication network 710. This disclosure contemplates any suitable transmission links 750, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 750 may connect to one or more networks 710, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 750. For example, the user device 730 may communicate with the transportation management system via a cellular network and the Internet, but communicate with the autonomous vehicle 740 via Bluetooth or a physical wire connection.

In particular embodiments, the transportation management system 760 may fulfill ride requests for one or more users 701 by dispatching suitable vehicles. The transportation management system 760 may receive any number of ride requests from any number of ride requestors 701. In particular embodiments, a ride request from a ride requestor 701 may include an identifier that identifies the ride requestor in the system 760. The transportation management system 760 may use the identifier to access and store the ride requestor's 701 information, in accordance with the requestor's 701 privacy settings. The ride requestor's 701 information may be stored in one or more data stores (e.g., a relational database system) associated with and accessible to the transportation management system 760. In particular embodiments, ride requestor information may include profile information about a particular ride requestor 701. In particular embodiments, the ride requestor 701 may be associated with one or more categories or types, through which the ride requestor 701 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 760 may classify a user 701 based on known information about the user 701 (e.g., using machine-learning classifiers), and use the classification to retrieve relevant aggregate information associated with that class. For example, the system 760 may classify a user 701 as a young adult and retrieve relevant aggregate information associated with young adults, such as the type of music generally preferred by young adults.

Transportation management system 760 may also store and access ride information. Ride information may include locations related to the ride, traffic data, route options, optimal pick-up or drop-off locations for the ride, or any other suitable information associated with a ride. As an example and not by way of limitation, when the transportation management system 760 receives a request to travel from San Francisco International Airport (SFO) to Palo Alto, Calif., the system 760 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 760. For example, historical data may include aggregate information generated based on past ride information, which may include any ride information described herein and telemetry data collected by sensors in autonomous vehicles and/or user devices. Historical data may be associated with a particular user (e.g., that particular user's preferences, common routes, etc.), a category/class of users (e.g., based on demographics), and/or all users of the system 760. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 760 in particular embodiments may predict and provide ride suggestions in response to a ride request. In particular embodiments, the system 760 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and/or semi-supervised learning based on a mixture of labeled and unlabeled training data.

In particular embodiments, transportation management system 760 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 760 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 730 (which may belong to a ride requestor or provider), a transportation management system 760, vehicle system 740, or a third-party system 770 to process, transform, manage, retrieve, modify, add, or delete the information stored in the data store.

In particular embodiments, transportation management system 760 may include an authorization server (or any other suitable component(s)) that allows users 701 to opt-in to or opt-out of having their information and actions logged, recorded, or sensed by transportation management system 760 or shared with other systems (e.g., third-party systems 770). In particular embodiments, a user 701 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 701 of transportation management system 760 through blocking, data hashing, anonymization, or other suitable techniques as appropriate.

In particular embodiments, third-party system 770 may be a network-addressable computing system that may provide HD maps or host GPS maps, customer reviews, music or content, weather information, or any other suitable type of information. Third-party system 770 may generate, store, receive, and send relevant data, such as, for example, map data, customer review data from a customer review website, weather data, or any other suitable type of data. Third-party system 770 may be accessed by the other computing entities of the network environment either directly or via network 710. For example, user device 730 may access the third-party system 770 via network 710, or via transportation management system 760. In the latter case, if credentials are required to access the third-party system 770, the user 701 may provide such information to the transportation management system 760, which may serve as a proxy for accessing content from the third-party system 770.

In particular embodiments, user device 730 may be a mobile computing device such as a smartphone, tablet computer, or laptop computer. User device 730 may include one or more processors (e.g., CPU and/or GPU), memory, and storage. An operating system and applications may be installed on the user device 730, such as, e.g., a transportation application associated with the transportation management system 760, applications associated with third-party systems 770, and applications associated with the operating system. User device 730 may include functionality for determining its location, direction, or orientation, based on integrated sensors such as GPS, compass, gyroscope, or accelerometer. User device 730 may also include wireless transceivers for wireless communication and may support wireless communication protocols such as Bluetooth, near-field communication (NFC), infrared (IR) communication, WI-FI, and/or 2G/3G/4G/LTE mobile communication standard. User device 730 may also include one or more cameras, scanners, touchscreens, microphones, speakers, and any other suitable input-output devices.

In particular embodiments, the vehicle 740 may be an autonomous vehicle and equipped with an array of sensors 744, a navigation system 746, and a ride-service computing device 748. In particular embodiments, a fleet of autonomous vehicles 740 may be managed by the transportation management system 760. The fleet of autonomous vehicles 740, in whole or in part, may be owned by the entity associated with the transportation management system 760, or they may be owned by a third-party entity relative to the transportation management system 760. In either case, the transportation management system 760 may control the operations of the autonomous vehicles 740, including, e.g., dispatching select vehicles 740 to fulfill ride requests, instructing the vehicles 740 to perform select operations (e.g., head to a service center or charging/fueling station, pull over, stop immediately, self-diagnose, lock/unlock compartments, change music station, change temperature, and any other suitable operations), and instructing the vehicles 740 to enter select operation modes (e.g., operate normally, drive at a reduced speed, drive under the command of human operators, and any other suitable operational modes).

In particular embodiments, the autonomous vehicles 740 may receive data from and transmit data to the transportation management system 760 and the third-party system 770. Example of received data may include, e.g., instructions, new software or software updates, maps, 3D models, trained or untrained machine-learning models, location information (e.g., location of the ride requestor, the autonomous vehicle 740 itself, other autonomous vehicles 740, and target destinations such as service centers), navigation information, traffic information, weather information, entertainment content (e.g., music, video, and news) ride requestor information, ride information, and any other suitable information. Examples of data transmitted from the autonomous vehicle 740 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 740, passengers may send/receive data to the transportation management system 760 and/or third-party system 770), and any other suitable data.

In particular embodiments, autonomous vehicles 740 may also communicate with each other as well as other traditional human-driven vehicles, including those managed and not managed by the transportation management system 760. For example, one vehicle 740 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) and/or over a network (e.g., the Internet or via the transportation management system 760 or third-party system 770).

In particular embodiments, an autonomous vehicle 740 may obtain and process sensor/telemetry data. Such data may be captured by any suitable sensors. For example, the vehicle 740 may have aa Light Detection and Ranging (LiDAR) sensor array of multiple LiDAR transceivers that are configured to rotate 360°, emitting pulsed laser light and measuring the reflected light from objects surrounding vehicle 740. In particular embodiments, LiDAR transmitting signals may be steered by use of a gated light valve, which may be a MEMs device that directs a light beam using the principle of light diffraction. Such a device may not use a gimbaled mirror to steer light beams in 360° around the autonomous vehicle. Rather, the gated light valve may direct the light beam into one of several optical fibers, which may be arranged such that the light beam may be directed to many discrete positions around the autonomous vehicle. Thus, data may be captured in 360° around the autonomous vehicle, but no rotating parts may be necessary. A LiDAR is an effective sensor for measuring distances to targets, and as such may be used to generate a three-dimensional (3D) model of the external environment of the autonomous vehicle 740. As an example and not by way of limitation, the 3D model may represent the external environment including objects such as other cars, curbs, debris, objects, and pedestrians up to a maximum range of the sensor arrangement (e.g., 50, 100, or 200 meters). As another example, the autonomous vehicle 740 may have optical cameras pointing in different directions. The cameras may be used for, e.g., recognizing roads, lane markings, street signs, traffic lights, police, other vehicles, and any other visible objects of interest. To enable the vehicle 740 to "see" at night, infrared cameras may be installed. In particular embodiments, the vehicle may be equipped with stereo vision for, e.g., spotting hazards such as pedestrians or tree branches on the road. As another example, the vehicle 740 may have radars for, e.g., detecting other vehicles and/or hazards afar. Furthermore, the vehicle 740 may have ultrasound equipment for, e.g., parking and obstacle detection. In addition to sensors enabling the vehicle 740 to detect, measure, and understand the external world around it, the vehicle 740 may further be equipped with sensors for detecting and self-diagnosing the vehicle's own state and condition. For example, the vehicle 740 may have wheel sensors for, e.g., measuring velocity; global positioning system (GPS) for, e.g., determining the vehicle's current geolocation; and/or inertial measurement units, accelerometers, gyroscopes, and/or odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, an autonomous vehicle 740 may build a 3D model of its surrounding based on data from its LiDAR, radar, sonar, and cameras, along with a pre-generated map obtained from the transportation management system 760 or the third-party system 770. Although sensors 744 appear in a particular location on autonomous vehicle 740 in FIG. 7, sensors 744 may be located in any suitable location in or on autonomous vehicle 740. Example locations for sensors include the front and rear bumpers, the doors, the front windshield, on the side panel, or any other suitable location.

In particular embodiments, the autonomous vehicle 740 may be equipped with a processing unit (e.g., one or more CPUs and GPUs), memory, and storage. The vehicle 740 may thus be equipped to perform a variety of computational and processing tasks, including processing the sensor data, extracting useful information, and operating accordingly. For example, based on images captured by its cameras and a machine-vision model, the vehicle 740 may identify particular types of objects captured by the images, such as pedestrians, other vehicles, lanes, curbs, and any other objects of interest.

In particular embodiments, the autonomous vehicle 740 may have a navigation system 746 responsible for safely navigating the autonomous vehicle 740. In particular embodiments, the navigation system 746 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 746 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 746 may use its determinations to control the vehicle 740 to operate in prescribed manners and to guide the autonomous vehicle 740 to its destinations without colliding into other objects. Although the physical embodiment of the navigation system 746 (e.g., the processing unit) appears in a particular location on autonomous vehicle 740 in FIG. 7, navigation system 746 may be located in any suitable location in or on autonomous vehicle 740. Example locations for navigation system 746 include inside the cabin or passenger compartment of autonomous vehicle 740, near the engine/battery, near the front seats, rear seats, or in any other suitable location.

In particular embodiments, the autonomous vehicle 740 may be equipped with a ride-service computing device 748, which may be a tablet or any other suitable device installed by transportation management system 760 to allow the user to interact with the autonomous vehicle 740, transportation management system 760, other users 701, or third-party systems 770. In particular embodiments, installation of ride-service computing device 748 may be accomplished by placing the ride-service computing device 748 inside autonomous vehicle 740, and configuring it to communicate with the vehicle 740 via a wire or wireless connection (e.g., via Bluetooth). Although FIG. 7 illustrates a single ride-service computing device 748 at a particular location in autonomous vehicle 740, autonomous vehicle 740 may include several ride-service computing devices 748 in several different locations within the vehicle. As an example and not by way of limitation, autonomous vehicle 740 may include four ride-service computing devices 748 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 748 may be detachable from any component of autonomous vehicle 740. This may allow users to handle ride-service computing device 748 in a manner consistent with other tablet computing devices. As an example and not by way of limitation, a user may move ride-service computing device 748 to any location in the cabin or passenger compartment of autonomous vehicle 740, may hold ride-service computing device 748, or handle ride-service computing device 748 in any other suitable manner. Although this disclosure describes providing a particular computing device in a particular manner, this disclosure contemplates providing any suitable computing device in any suitable manner.

Figure 8:
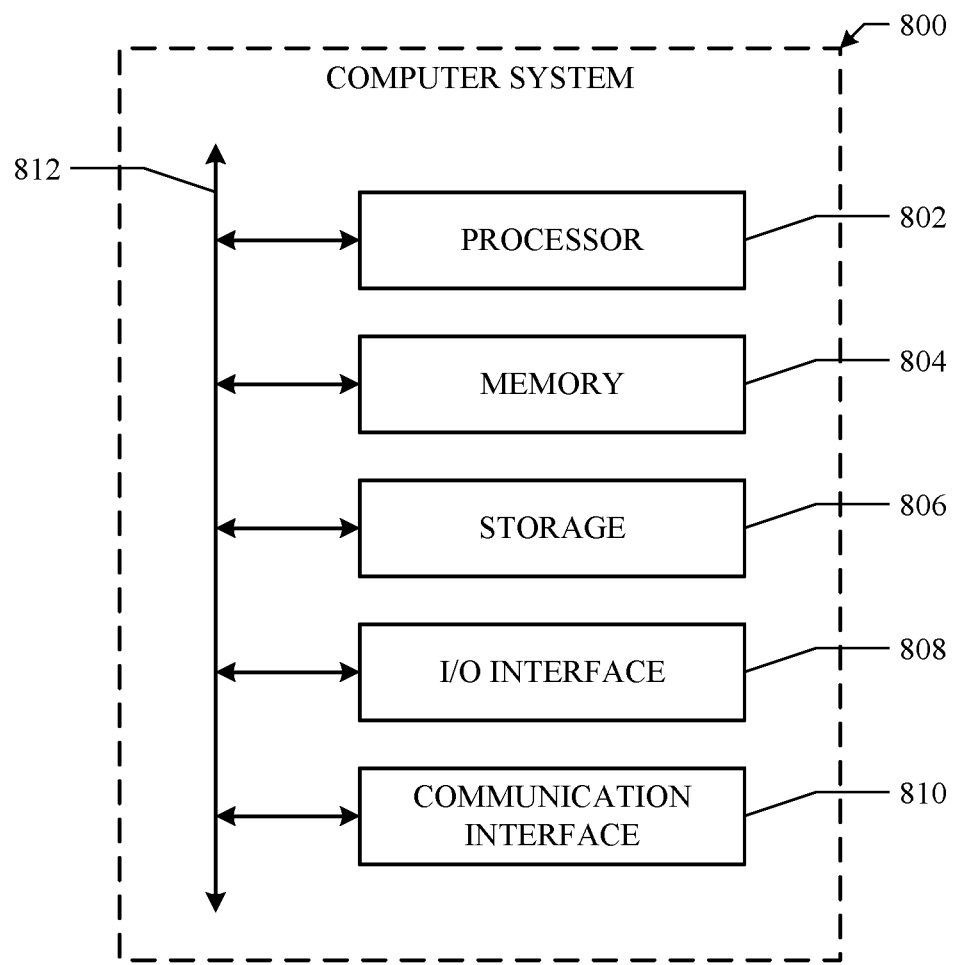
FIG. 8 illustrates an example computing system.

FIG. 8 illustrates an example computer system 800. In particular embodiments, one or more computer systems 800 perform one or more steps of one or more methods described or illustrated herein. In particular embodiments, one or more computer systems 800 provide the functionalities described or illustrated herein. In particular embodiments, software running on one or more computer systems 800 performs one or more steps of one or more methods described or illustrated herein or provides the functionalities described or illustrated herein. Particular embodiments include one or more portions of one or more computer systems 800. Herein, a reference to a computer system may encompass a computing device, and vice versa, where appropriate. Moreover, a reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 that are to be operated on by computer instructions; the results of previous instructions executed by processor 802 that are accessible to subsequent instructions or for writing to memory 804 or storage 806; or any other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs), be a multi-core processor, or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described in further detail below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular

What is claimed is:

1. A method comprising, by a computing system:
accessing a plurality of features extracted from one or more images, wherein the plurality of features are associated with an object captured in the one or more images, and wherein the one or more images are captured by a camera associated with a vehicle;
identifying, in a reference map, one or more reference features that match one or more features of the plurality of features extracted from the one or more images, wherein the one or more reference features are associated with the object captured in the one or more images; and
generating a calibration model by comparing the one or more identified reference features in the reference map and the one or more features of the plurality of features that are extracted from the one or more images and match the one or more identified reference features, wherein the calibration model is generated based on one or more disagreements between the one or more identified reference features and the one or more features extracted from the one or more images, and wherein the calibration model is capable of being used to calibrate the camera associated with the vehicle.

2. The method of claim 1, wherein the one or more images are uncalibrated images captured by the camera associated with the vehicle, and wherein the camera is uncalibrated for an environment surrounding the camera.

3. The method of claim 1, wherein the camera captures one or more subsequent images of an environment surrounding the camera, and wherein the one or more subsequent images are impacted by one or more environmental factors comprising one or more of:
a geometric property of the camera;
a windshield;
a mounting position;
a mounting angle;
a view angle;
a white balancing issue;
a rolling shutter; or
a color issue.

4. The method of claim 3, wherein the calibration model is used to calibrate the one or more subsequent images for one or more distortions, and wherein the one or more distortions are caused by the one or more environmental factors.

5. The method of claim 3, wherein the one or more subsequent images are captured by the camera at locations outside high definition areas of the reference map.

6. The method of claim 5, further comprising:
expanding the reference map based on the calibrated one or more subsequent images to the locations where the one or more subsequent images are captured.

7. The method of claim 3, wherein the one or more subsequent images are captured by the camera at locations that are within one or more high definition areas of the reference map.

8. The method of claim 7, further comprising:
improving the reference map based on the calibrated one or more subsequent images at the locations where the one or more subsequent images are captured.

9. The method of claim 1, wherein the one or more reference features in the reference map provide a higher degree of detail and accuracy than the one or more features extracted from the one or more images captured by the camera.

10. The method of claim 1, further comprising:
determining a first location of the vehicle being within a threshold distance to a second location in the reference map, wherein the second location is associated with the object captured in the one or more images, and wherein the first location of the vehicle is identified at least in part using a GPS sensor or a localization technique.

11. The method of claim 10, wherein the object is within an overlapping area between a first scene captured in the one or more first images and a second scene associated with the second location in the reference map.

12. The method of claim 1, further comprising:
determining that one or more blurred images captured by the camera contain motion blurs; and
excluding the one or more blurred images with the motion blurs from being used in generating the calibration model or expanding the reference map.

13. The method of claim 1, wherein each of the plurality of features extracted from the one or more images is associated with a feature descriptor, wherein each of the one or more reference features is associated with a reference feature descriptor, and wherein each reference feature of the one or more reference features is identified based on a determination that an associated reference feature descriptor matches a corresponding feature descriptor of a corresponding feature of the plurality of features extracted from the one or more images.

14. The method of claim 1, wherein the plurality of features extracted from the one or more images comprises one or more of:
an object;
a dimension of an object;
a size of an object;
a surface of an object;
a corner of an object;
an edge of an object;
a relation of two or more objects;
a line;
a direction of a line;
a length of a line;
a curve;
a pattern;
a shape;
one or more points in a three-dimensional space;
a converging point;
a distance;
a view angle;
a three-dimensional vector;
a two-dimensional vector;
a color;
a color distribution;
a lighting condition; or
a relation of two or more features.

15. The method of claim 1, wherein the one or more images are captured by the camera within a threshold time period after the reference map is generated.

16. The method of claim 1, wherein the computing system is associated with the camera and the vehicle, and wherein the computing system transmits the plurality of features to a second computing system through a connection with a limited bandwidth.

17. The method of claim 16, further comprising
identifying, in the reference map, one or more subsequent reference features matching the one or more features of the plurality of features extracted from the one or more images, wherein the calibration model is generated based on the one or more subsequent reference features.

18. One or more non-transitory computer-readable storage media including instructions that are operable, when executed by at least one processor of a computing system, to cause the computing system to:

access a plurality of features extracted from one or more images, wherein the plurality of features are associated with an object captured in the one or more images, and wherein the one or more images are captured by a camera associated with a vehicle;

identify, in a reference map, one or more reference features that match one or more features of the plurality of features extracted from the one or more images, wherein the one or more reference features are associated with the object captured in the one or more images; and generate a calibration model by comparing the one o more identified reference features in the reference map and the one or more features of the plurality of features that are extracted from the one or more images and match the one or more identified reference features, wherein the calibration model is generated based on one or more disagreements between the one or more identified reference features and the one or more features extracted from the one or more images, and wherein the calibration model is capable of being used to calibrate the camera associated with the vehicle.

19. A system comprising:

one or more non-transitory computer-readable storage media embodying instructions; and one or more processors coupled to the one or more non-transitory computer-readable storage media and operable to execute the instructions to:

access a plurality of features extracted from one or more images, wherein the plurality of features are associated with an object captured in the one or more images, and wherein the one or more images are captured by a camera associated with a vehicle;

identify, in a reference map, one or more reference features matching one or more of features the plurality of features extracted from the one or more images, wherein the one or more reference features are associated with the object captured in the one or more images; and generate a calibration model by comparing the one or more identified reference features in the reference map and the one or more features of the plurality of features that are extracted from the one or more images and match the one or more identified reference features, wherein the calibration model is generated based on one or more disagreements between the one or more identified reference features and the one or more features extracted from the one or more images, and wherein the calibration model is capable of being used to calibrate the camera associated with the vehicle.

* * * * *